United States Patent [19]

Robinson

[11] 3,852,593

[45] Dec. 3, 1974

[54] PULSED NEUTRON CAPTURE LOGGING FOR DETERMINING RESIDUAL OIL

[75] Inventor: Joseph D. Robinson, Houston, Tex.

[73] Assignee: Shell Oil Company, Houston, Tex.

[22] Filed: May 10, 1973

[21] Appl. No.: 359,160

Related U.S. Application Data

[63] Continuation-in-part of Ser. No. 300,700, Oct. 25, 1972, abandoned.

[52] U.S. Cl. .............................. 250/259, 250/270
[51] Int. Cl. ............................................. G01v 5/00
[58] Field of Search ................... 250/259, 262, 270

[56] References Cited
UNITED STATES PATENTS

| | | | |
|---|---|---|---|
| 2,991,364 | 7/1961 | Goodman | 250/262 |
| 3,562,523 | 2/1971 | Richardson et al. | 250/259 |
| 3,586,858 | 6/1971 | Youmans | 250/259 |
| 3,631,245 | 12/1971 | Jorden, Jr. et al. | 250/259 |

*Primary Examiner*—Archie R. Borchelt

[57] ABSTRACT

A method for determining residual oil saturation in a formation using a pulsed neutron capture logger and making two measurements, the first measurement being made with the indigenous fluid in place and the second measurement being made with a portion of the indigenous fluid displaced. Each of the two measurements consists of two counting periods during which the number of gamma rays are counted, the first counting period of each measurement being at least 500 microseconds after the neutron pulse.

6 Claims, 1 Drawing Figure

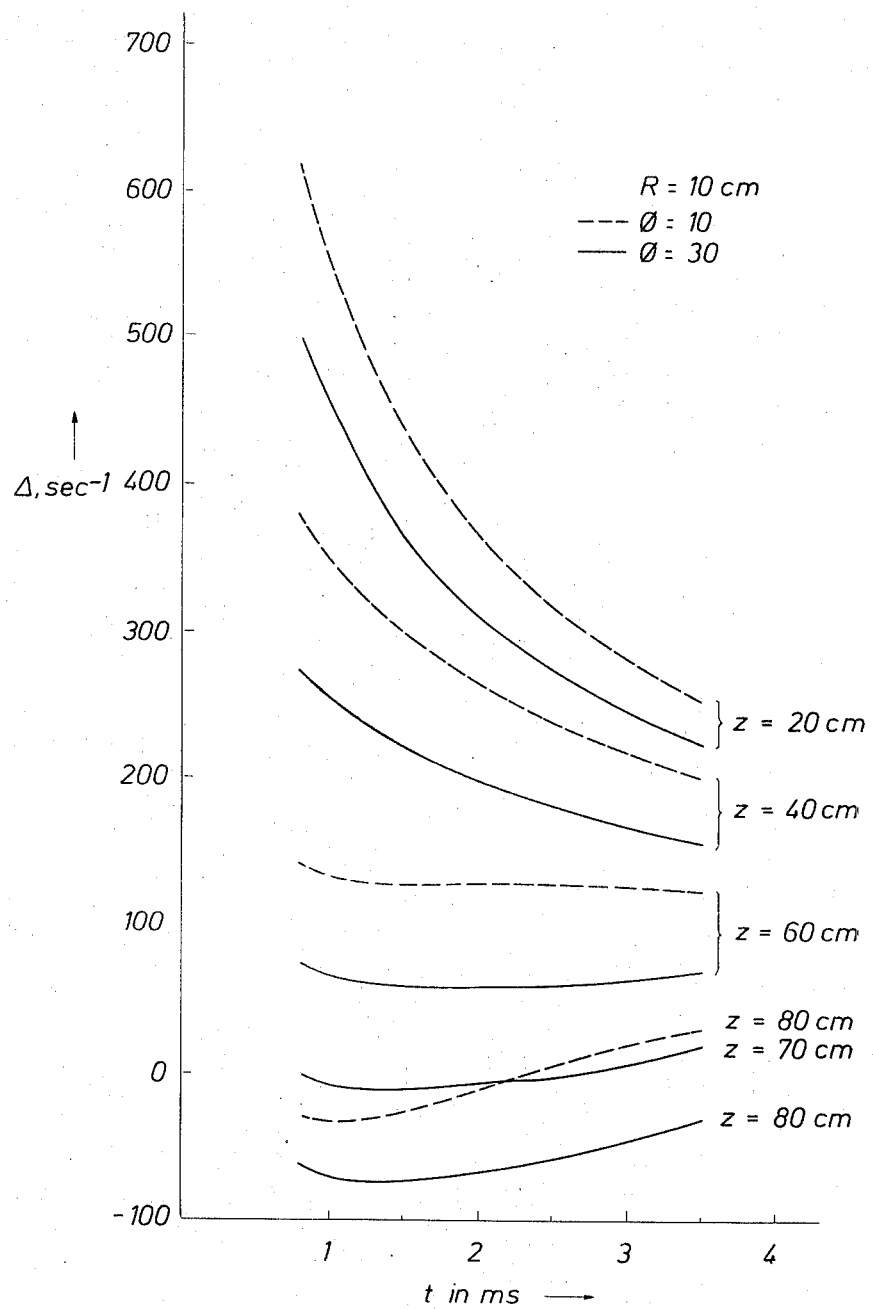

PULSED NEUTRON CAPTURE LOGGING FOR DETERMINING RESIDUAL OIL

RELATED PATENTS

The present application is related to U.S. Pat. Nos. 3,562,523 and 3,631,245 and is a continuation-in-part of the applicant's copending application Ser. No. 300,700, filed Oct. 25, 1972, now abandoned.

BACKGROUND OF THE INVENTION

The above referenced patents describe methods utilizing pulsed neutron capture loggers to determine the residual oil or hydrocarbon remaining in a formation. More particularly, U.S. pat. No. 3,562,523 describes a method for determining the residual oil in a formation that has been reduced to waterflood residual oil saturation. The method comprises determining the thermal neutron decay rate with the indigenous formation fluids in place and then within the radius of investigation of the logger replacing the formation water with a water having a materially different cross-section, after which the thermal neutron decay measurements are repeated. The replacement of water with water having a materially different cross-sections eliminates the cross-section of the formation from calculations used in determining the thermal neutron decay time.

U.S. Pat. No. 3,631,245 describes a similar method for determining residual oil saturation but substitutes a chemical flood for the water displacement used in the first patent. More particularly, a chemical flood is used to remove all the oil from the formation while allowing the formation water to remain in place. Again two separate measurements of the thermal neutron decay time are made from which one can determine the residual oil saturation.

Both of the above inventions depend upon the accuracy of the measurement of the thermal neutron decay time as determined by the pulse neutron capture logging tool. This type of logging tool comprises a source of fast neutrons; for example, a source of 14 MEV neutrons that are produced on demand in relatively short pulses. The fast neutrons rapidly lose kinetic energy and become thermal neutrons which may be measured directly by thermal neutron detectors or indirectly by measuring the gamma rays produced when a thermal neutron is captured.

It is known that the diffusion of thermal neutrons in the borehole, formation materials and the contents of the borehole seriously affect the measurements of thermal neutron flux in the borehole. Thus logging companies developed what are known as departure curves for correcting the measurements so that they more closely represent true measurements of neutron life time in the formation. The departure curves are based on laboratory measurements in small samples of formations and formation materials. Obviously, such measurements represent only very limited cases and the departure curves can be in serious error. The presence of small amounts of certain elements in a formation will cause serious errors in the published departure curves. Further, it is practically impossible to duplicate in a laboratory the formations encountered in a borehole. It is not uncommon to have 25 to 35 percent errors in residual oil saturations determined from data that utilizes published departure curves.

BRIEF SUMMARY OF THE INVENTION

The present invention solves the above problems by making the thermal neutron decay measurements at times when the diffusion of the thermal neutrons and the composition of the materials in the borehole contribute substantially constant deviation. Thus the effect of the diffusion and borehole will be substantially cancelled from the final results and the need for departure curves to correct the measurements will be eliminated.

More particularly, the present invention relates to the type of pulse neutron capture loggers that utilized the gamma ray counting technique for measuring thermal neutron decay. In particular, the invention counts the gamma rays during two gate periods with the first gate period beginning preferably 800 microseconds after the termination of the neutron pulse. While it may be possible to initiate the first gate period before 800 microseconds, in no case should it be initiated before 500 microseconds after the termination of the neutron pulse. The second gate period is initiated 200 microseconds or less after the termination of the first gate period with both gate periods being comparable in width. Since both gate periods occur when the neutron decay has reached a relatively low level, relatively large numbers of repeated pulses must be used to acquire sufficient data for reliable results. While this long stationary period would normally be uneconomical in logging operations over the whole extent of the borehole, it is no problem in the present technique since the formations that are being evaluated are well defined, relatively short intervals.

BRIEF DESCRIPTION OF THE DRAWINGS

The invention will be more easily understood from the following description when taken with the attached drawing showing the slope of the logarithm of the capture gamma activity plotted against the time.

DESCRIPTION OF PREFERRED EMBODIMENT

U.S. Pat. No. 3,562,523 which is incorporated herein by reference describes the use of the pulsed neutron capture logger for determining the residual oil saturation remaining in a formation that has been reduced to waterflood residual oil. While the method described in the above patent can utilize either thermal neutron or gamma ray measurements, the present invention can only be used with gamma ray measurements. As explained in the patent, a pulsed neutron capture logger generates at predetermined time intervals pulses of 14 MEV neutrons that are slowed by passage through the borehole and formation materials to thermal neutrons. The thermal neutrons are captured by borehole and formation materials that return to ground state by the release of a gamma ray. The number of gamma rays present at any time is related to the thermal neutron decay. The gamma rays are counted over two time intervals to determine the slope of the thermal neutron decay curve. Normally the gates that control the length of the time intervals are preset and positioned with respect to the termination of the neutron pulse.

In a paper published by Polyachenko, et al, in the Russian literature Nuclear Geophysics, 1969, No. 7, pages 40 to 56 and available as a translation from Associated Technical Services, Inc., 855 Bloomfield Avenue, Glenridge, N.J, there is given a theoretical analysis of the space-time distribution of capture gamma rays that follow a pulse of 14 MEV neutrons in an approximate model of a pulse neutron capture logger and wellbore. From model in the above article, the number of gamma quanta appearing on the axis of the borehole of a radius $R$ at a distance $z$ from the source of neutrons that were emitted at a time $t = 0$ can be shown to be $$N(0,z,t) = \frac{\pi \nu}{\tau} \frac{R^2}{\pi^4 \vartheta_n \vartheta_r} e^{-t/\tau} \int_0^\infty dK \cos Kz e^{-Dtk^2} \int_0^\infty sds e^{Dts^2/R^2}$$

$$\times \frac{K_0(R\sqrt{K^2+\vartheta_n^{-1}}) K_0(R\sqrt{K^2+\vartheta_r^{-1}})}{(S^2+R^2K^2+R^2\vartheta_n^{-1})(S^2+R^2K^2+R^2\vartheta_r^{-1})} \frac{1}{J_0^2(S)+Y_0^2(S)}$$

The above relation is incorrect in the article of Polyachenko, et al. From the above, both $N(0,z,t)$ and the value of $-d\ln N(0,z,t)/dt$ may be evaluated directly. The result is $-d\ln N/dt = 1/t + \Delta$ given by $$\Delta = \frac{D}{R^2} \frac{\int_0^\infty dK \cos Kz e^{-Dtk^2} \int_0^\infty sds e^{-Dts^2/R^2}(K^2R^2+S^2)f(s,k)}{\int_0^\infty dK \cos Kz e^{-Dtk^2} \int_0^\infty sds e^{-Dts^2/R^2} f(s,k)}$$

where $$f(s,k) = \frac{K_0(R\sqrt{K^2+\vartheta_n^{-1}}) K_0(R\sqrt{K^2+\vartheta_r^{-1}})}{(S^2+R^2K^2+R^2\vartheta_n^{-1})(S^2+R^2K^2+R^2\vartheta_r^{-1})} \frac{1}{J_0^2(S)+Y_0^2(S)}$$

Referring to the enclosed figure, there is shown an evaluation of the above expression for a borehole having a radius of 10 cm and porosities $\phi = 10\%$ and $\phi = 30\%$, respectively. The data are plotted for various distances $z$ between the source and the detector. As can be seen for times greater than 800 microseconds, the value of $\Delta$ changes very little over the interval during which the two counting gates are positioned. In contrast, below 800 microseconds, the value of $\Delta$ increases to extremely high values and the rate of change is high and unpredictable. More particularly, one may obtain values of $\Delta$ in the range of 500 to 1,000 sec$^{-1}$. In contrast, typical values for the reciprocal of the decay time of the thermal neutrons would range between 10,000 sec$^{-1}$ for shaley sand or sands infiltrated with water having a high chlorine content to 5,000 sec$^{-1}$ for sandstones and 2,000 sec$^{-1}$ for limestone. Thus the value of $\Delta$ could be as much as 33% or more of the true value of the decay time.

When one refers to the formulas for determining residual oil saturation contained in the above referenced patents, it would be easily appreciated that a large error in the measurement of the thermal neutron decay time would render the resulting values of residual oil saturation essentially useless. This is particularly true when the profitability of a tertiary recovery project may depend on measurement of residual oil saturation within 1% to 2%.

In contrast in the present invention where the gamma counting gates are initiated at least 500 microseconds and preferably 800 microseconds after the termination of the pulse of neutrons and completed approximately 1,200 to 1,400 microseconds after production of the pulse the change in $\Delta$ can be neglected. For example, referring to the enclosed figure, even with a source detector spacing of 40 centimeters, the change in $\Delta$ in this time range would only be in the neighborhood of 50 to 75 sec-1. Even for the highest thermal neutron decay times, this would only represent less than a 3% error. Of course, as seen from the enclosed figure, if one would use a source-detector spacing of approximately 70 centimeters, $\Delta$ would be substantially zero and the measurements obtained would be true decay time.

The method of this invention is used to practice the method set forth in the above patents using a logging tool having a gamma detector. The first counting gate is set to commence approximately 800 microseconds after the neutron pulse, while the second counting gate commences 200 microseconds or less after the first counting gate. Both counting gates have a width of a few hundred microseconds.

As set forth in the patents two separate sets of measurements are made and may be written as:

$$(1/\tau a)_1 = (1/\tau)_1 + \Delta_1 \quad (1/\tau a)_2 = (1/\tau)_2 + \Delta_2$$

and when the second expression is subtracted from the first the term will cancel. Since the value of $\Delta$ doesn't change with changes in the cross-section or salinity, it will remain the same for both measurements.

The above results cannot be obtained using present logging procedures where the correction to the apparent neutron lifetime varies over a wide range between the two counting gates and is also dependent on the change in fluids.

In practicing the present invention, it is desirable to accumulate several hundred counts for each counting gate for precise work. In an average formation only a few counts will be obtained for each neutron pulse when the counting gates are disposed as set forth above, and the tool will remain opposite each formation of interest for perhaps tens of minutes.

Alternately, the data could be recorded with a multichannel time-of-flight instrument and the net counts per channel fit by a least squares procedure to an exponential function of time. The initial channel of the instrument should be set at a time 2 1/2T after the neutron pulse where the gamma flux decays as $e^{-t/t}$ for $t > 2½T$. The value of 2 ½T for average formations and fluids encountered will be between 500 and 800 or more microseconds.

In addition to the above measurements, it is necessary to obtain a measurement of the background gamma radiation. This measurement can be obtained following the procedures described in the above patents and is used to correct gross measurements to net measurements by subtracting the background radiation.

In some cases it may be necessary to increase the time interval between sets of neutron pulses to allow the nitrogen-16 to decay. As explained in the above patent, fast neutrons interact with oxygen-16 to produce nitrogen-16 plus a proton. The nitrogen emits a beta particle which leaves oxygen as the nucleus in an excited state. The oxygen decays by the release of two gamma rays. The nitrogen has a half life of about 7.3 seconds and this activity will build up if the logger remains stationary for a long time. Thus, it may be necessary to space the sets of neutron pulses 30 seconds apart.

I claim as my invention:

1. A method for determining the residual oil present in a formation by the measurement of decay of capture gamma activity using a pulsed neutron capture technique wherein a portion of the indigenous formation fluid is displaced by another fluid and measurements of the decay of capture gamma activity are made before and after the displacement of the indigenous formation fluid, said method comprising:

measuring said decay of capture gamma activity by counting after the production of the neutron pulse the gamma rays during two separate time intervals, the first of said time intervals starting at least 500 microseconds after the production of a neutron pulse.

2. The method of claim 1 wherein the first time interval starts 800 microseconds after the production of the neutron pulse and said second time interval starts not more than 200 microseconds after said first time interval.

3. The method of claim 1 wherein the indigenous formation fluid has been reduced to an oil saturation of not more than a waterflood residual oil saturation.

4. The method of claim 1 wherein the counting of the gamma rays is done at a location at least 35 centimeters from the point at which the neutron pulse is produced.

5. The method of claim 1 in which said neutron pulses and gamma counting step are repeated until total counts exceeding several hundred are obtained for each measurement.

6. The method of claim 1 wherein the aqueous liquid in the formation is replaced within the radius of said thermal neutrons with an aqueous liquid having a materially different cross-section.

* * * * *